United States Patent [19]

Adams et al.

[11] Patent Number: 5,422,199
[45] Date of Patent: Jun. 6, 1995

[54] BATTERIES HAVING IMPROVED VENTING SYSTEMS

[75] Inventors: David W. Adams, Eagan; Deborah S. Baumgartner, Prior Lake, both of Minn.; Duane D. Hakarine, Brandon, Miss.

[73] Assignee: GNB Battery Technologies, Inc., Mendota Heights, Minn.

[21] Appl. No.: 162,707

[22] Filed: Dec. 6, 1993

[51] Int. Cl.[6] .............................................. H01M 2/12
[52] U.S. Cl. ........................................ 429/88; 429/89
[58] Field of Search ................................ 429/88, 89

[56] References Cited

U.S. PATENT DOCUMENTS

| | | |
|---|---|---|
| 2,571,893 | 10/1951 | Kendall . |
| 2,690,466 | 9/1954 | Kendall et al. . |
| 3,020,328 | 2/1962 | Jones . |
| 3,666,564 | 5/1972 | Corbin et al. ............... 429/88 |
| 3,798,073 | 3/1974 | Karpal ..................... 429/89 X |
| 3,802,597 | 4/1974 | Miller . |
| 3,879,227 | 4/1975 | Hennen . |
| 4,002,495 | 1/1977 | Hakarine . |
| 4,052,534 | 10/1977 | Devitt ...................... 429/89 X |
| 4,072,799 | 2/1978 | Lesson et al. . |
| 4,091,179 | 5/1978 | Szabo . |
| 4,091,180 | 5/1978 | Fox et al. ................... 429/84 |
| 4,168,350 | 9/1979 | Oxenreider et al. ........... 429/87 |
| 4,306,002 | 12/1981 | Heiser et al. ............... 429/84 |
| 4,315,058 | 2/1982 | Schwendener et al. ........ 429/84 |
| 4,328,290 | 5/1982 | Szymborski et al. .......... 429/54 |
| 4,371,591 | 2/1983 | Oxenreider et al. .......... 429/88 |
| 4,409,302 | 10/1983 | Poe ........................ 429/88 |
| 4,613,550 | 9/1986 | Jergl et al. ................ 429/53 |
| 4,636,446 | 1/1987 | Lee ........................ 429/54 |
| 4,689,281 | 8/1987 | Dandona et al. ............ 429/89 |
| 5,209,992 | 5/1993 | Feres ..................... 429/89 X |

OTHER PUBLICATIONS

Photographs numbered one (1) through five (5) showing various views of a "gang"-type vent assembly used in some Mazda vehicle batteries. (Date unknown).

*Primary Examiner*—Stephen Kalafut
*Attorney, Agent, or Firm*—Leydig, Voit & Mayer

[57] ABSTRACT

A wet, multicell, lead-acid electric storage battery is provided for. The battery comprises a container, a cover, one or more partition walls dividing the space within the container and cover into two or more cell cavities. The cover defines generally cylindrically shaped process holes associated with each cell cavity. The battery further comprises a venting system. The venting system comprises a manifold defined by the cover, the manifold having at least one opening in each process hole and at least one opening in the cover. The manifold is adapted to provide gaseous communication between the process holes and the ambient. The venting systems also comprises a venting plug associated with each process hole and adapted for insertion therein. The venting plugs have a generally cylindrical side wall, a closed upper end, an open lower end, and a central cavity. A vent aperture is located in the side wall of the venting plug and is in gaseous communication with the manifold and the venting plug central cavity. A baffle is positioned within the venting plug central cavity between the vent aperture and the lower end of the venting plug. The baffle is adapted to allow the passage of gases and to retard the passage of electrolyte from the cell cavity through the venting plug central cavity.

19 Claims, 2 Drawing Sheets

BATTERIES HAVING IMPROVED VENTING SYSTEMS

FIELD OF THE INVENTION

The present invention relates to electric storage batteries, and more particularly, to venting systems for wet, multicell, lead-acid, starting, lighting and ignition (SLI) electric storage batteries.

BACKGROUND OF THE INVENTION

A typical wet, multicell, lead-acid SLI storage battery is assembled from an open-topped, rectangular-shaped container which is sealed by a cover assembly. Both portions are formed from an injection molded thermoplastic polymer, such as polypropylene. The container and cover have partition walls which divide the space within the battery into a plurality of substantially isolated cell cavities. Each cell cavity contains an electrode stack which is immersed in electrolyte. The cover typically defines a plurality of generally cylindrically shaped process holes, one associated with each cell cavity, through which the cell cavities are initially filled with electrolyte. In maintenance batteries, the process holes are closed-off by plugs which can be removed so that electrolyte can be periodically added through the process holes for maintenance purposes.

Especially during charging, lead-acid storage batteries generate various gases in the cell cavities during operation, including hydrogen and oxygen. Hydrogen/oxygen mixtures create an obvious potential for explosion. In recombinant lead-acid batteries, hydrogen and oxygen gas is retained in large part in the battery and induced to recombine into water. In wet lead-acid storage batteries, however, such gases are allowed to escape from the cell cavity and ultimately pass out of the battery through a venting system.

There are a wide variety of known venting systems for expelling the volatile gases generated within a wet battery to the external, ambient space. In general, each particular configuration is directed to achieve a dual purpose: allowing gases to vent from within the battery, while retaining the electrolyte fluid therein.

That is, wet, lead-acid storage batteries are used in a tremendous variety of vehicles and applications. As a result such batteries are often subject to extreme and harsh operating environments. For example, batteries used in land moving vehicles such as bulldozers are frequently tilted at severe angles, as well as being subjected to intense operating vibrations. It is, therefore, apparent that electrolyte can splash about the interior of a battery during normal battery use, as well as during installation and shipment. To the extent that electrolyte can leak from the battery, however, the electrochemical performance of the battery may suffer. Accordingly, venting systems in wet lead-acid batteries are designed to retain the electrolyte within the battery cells, while at the same time freely allowing for the escape of gases generated within the cells.

As noted, there are a wide variety of venting systems presently employed in lead-acid storage batteries. Many of those venting systems, however, are unduly complex and, accordingly, excessively costly. Despite the continuing effort in this area there remains a need for batteries which have relatively simple venting systems which efficiently retain electrolyte while effectively venting gases in a relatively safe manner, but which can be easily and economically manufactured.

Accordingly, it is a primary object of the present invention to provide a battery having a venting system which is easily and economically manufactured.

It also is an object to provide a battery which vents gases generated with the cell cavities in a safe and efficient manner.

Another object of the present invention is to provide a battery having a venting system that minimizes the escape of electrolyte, even when the battery is vibrated or tilted at extreme angles.

Yet another object is to provide a battery wherein all of the above advantages are realized.

Additional objects, advantages and other novel features of the invention will be set forth in part in the description that follows and in part will become apparent to those skilled in the art upon examination of the following or may be learned with the practice of the invention.

SUMMARY OF THE INVENTION

The present invention provides for a wet, multicell, lead-acid electric storage battery comprising a container, a cover, one or more partition walls dividing the space within the container and cover into two or more cell cavities. The cover defines generally cylindrically shaped process holes associated with each cell cavity. The battery further comprises a venting system.

The venting system comprises a manifold defined by the cover, the manifold having at least one opening in each process hole and at least one opening in the cover. The manifold is adapted to provide gaseous communication between the process holes and the ambient.

The venting systems also comprises a venting plug associated with each process hole and adapted for insertion therein. The venting plugs have a generally cylindrical side wall, a closed upper end, an open lower end, and a central cavity. A vent aperture is located in the side wall of the venting plug and is in gaseous communication with the manifold and the venting plug central cavity. A baffle is positioned within the venting plug central cavity between the vent aperture and the lower end of the venting plug. The baffle is adapted to allow the passage of gases and to retard the passage of electrolyte from the cell cavity through the venting plug central cavity.

BRIEF DESCRIPTION OF THE DRAWINGS

The accompanying drawings incorporated in and forming a part of the specification, illustrate several aspects of the present invention, and together with the description serves to explain the principals of the invention. In the drawings.

DETAILED DESCRIPTION OF THE PREFERRED EMBODIMENTS

Figure 1:
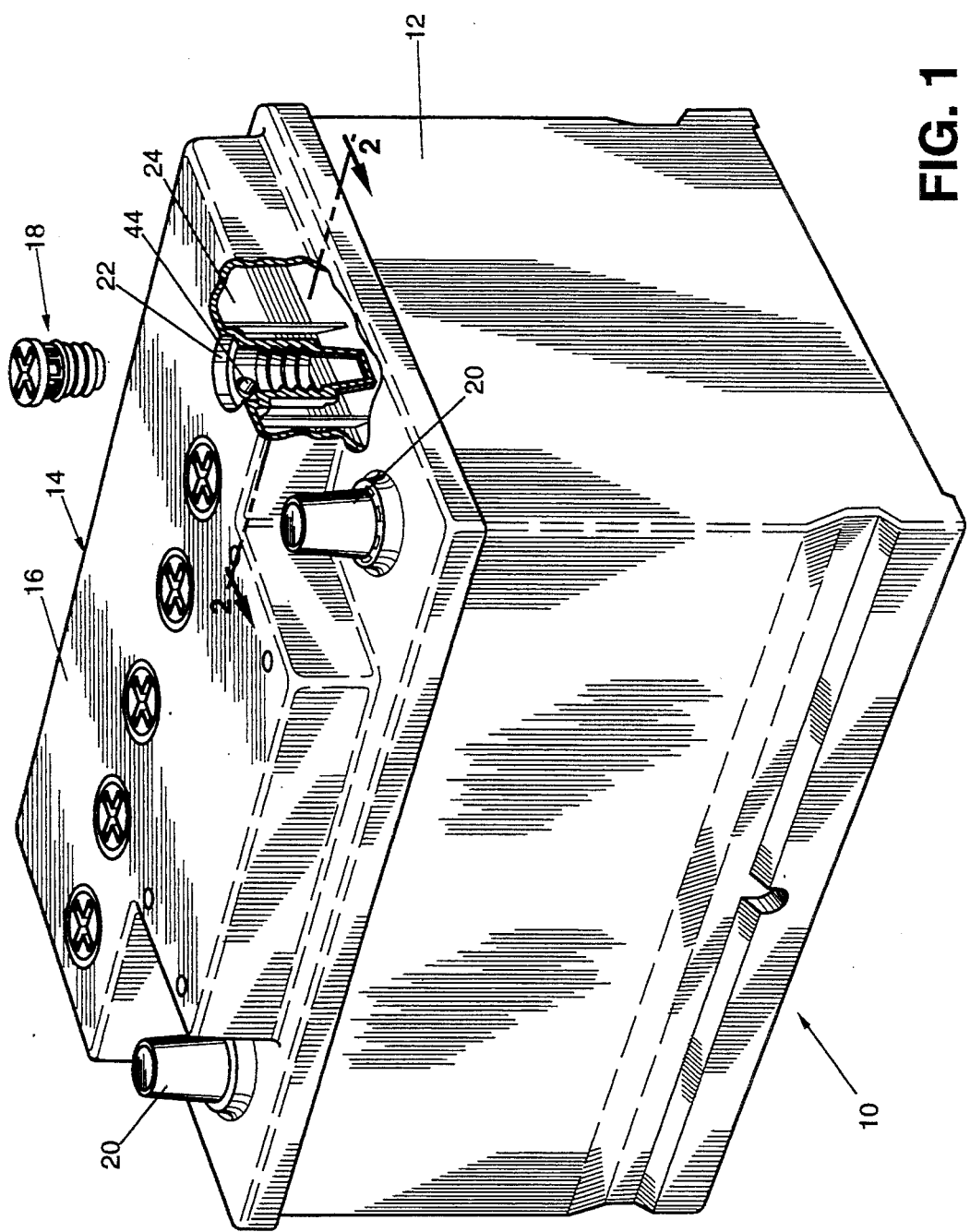
FIG. 1 is a perspective view of a preferred embodiment of the storage battery of the subject invention with a portion of the cover assembly thereof cut-away to illustrate certain details of the battery venting system.

Referring now to FIG. 1, a preferred embodiment of the wet, multicell lead-acid SLI batteries of the subject invention is shown and is generally designated by reference numeral 10. The battery 10 is constructed of a rectangular prism shaped container 12, to which is sealed a cover assembly 14. The cover assembly 14 comprises a cover 16 and six venting plugs 18. Mounted in and extending through the cover 16 are two terminal posts 20.

Figure 2:
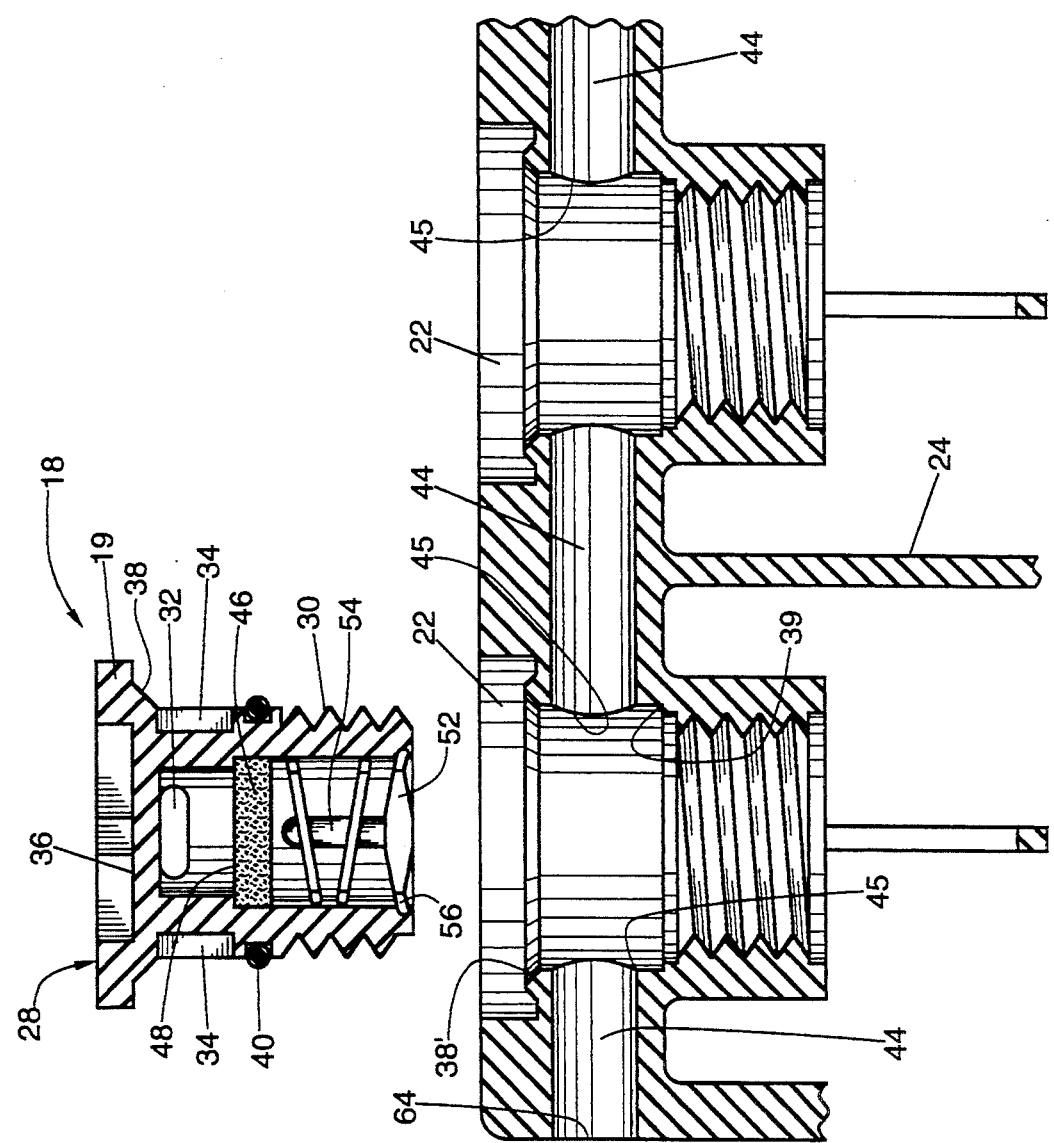
FIG. 2 is an exploded cross-sectional side view taken generally along line 2—2 in FIG. 1 of a portion of the battery cover assembly of the battery shown in FIG. 1, showing further details of the venting system of the present invention.

The interior of the battery 10, shown partially in FIGS. 1 and 2, is divided by five partition walls 24 into six separate cell cavities. Those cell cavities, also referred to as cells, house a plurality of series-connected electrode stacks.

A process hole 22 is provided in and defined by the cover 16 for each individual cell thereunder. The process holes 22 have a generally cylindrical shape, although they are provided with various features as described below. The process holes 22 allow access to the individual cells, so that each cell can be filled with liquid electrolyte, usually a dilute sulfuric acid, during manufacture of the battery. Venting plugs 18 are adapted for insertion into the process holes 22 so as to substantially close the process holes 22. The venting plugs 18 can be removed, however, so that water may be periodically added to maintain the proper level of electrolyte within the cells.

As previously discussed, gases are generated during the charging cycle of lead-acid batteries. Thus, the batteries of the subject invention comprise a venting system, as described in further detail below, which includes the venting plugs and a manifold and serves to vent gases from within the battery while hindering the escape of electrolyte.

Except for the venting system, as will be apparent from the description which follows, the batteries of the subject invention may be constructed according to known designs and methods. Batteries of the subject invention may have more or less than six cells. There are many known configurations for the container 12, cover 16, terminal posts 20, electrode stacks, and other components of wet, multi-cell, lead-acid SLI batteries, and in general such configurations may be used as desired in making batteries of the subject invention.

A partial and a more detailed view of the venting system incorporated into batteries of the subject invention is shown in FIG. 2. Those portions of the venting system not shown therein are substantially identical to the illustrated portions, as will be appreciated from the discussion which follows. That is, the venting system includes a manifold which is defined by the cover and is adapted to provide gaseous communication between the process holes and the ambient. In the preferred embodiment 10, a manifold 44' is integrally formed in the cover 16, that is, the manifold is formed in the cover and defined thereby without using any auxiliary cover pieces. The manifold 44' may be visualized as a cylindrical passageway extending through the process holes 22 and the cover 16. That is, the manifold 44' consists of a series of axially aligned, cylindrically shaped passageways 44 extending between openings 45 in the side walls of adjacent process holes 22 and between openings 45 in the side walls of end process holes 22 and openings 64 in the sides of the cover 16. The passageways 44 have a relatively large cross-section to facilitate rapid communication of gases therethrough.

Manifold 44' is preferred because it is relatively easily formed in an injection-molded cover without employing auxiliary cover pieces. It also efficiently vents gas to the ambient, aiding especially in the venting of gases from the middle process holes 22. Other configurations may be used, however: for example, two sets of three process holes may be manifolded by two separate integrally-formed cylindrical passageways, one extending through each set of process holes to the ambient. More complicated manifolds may be provided if the cover is constructed of two or more pieces, but absent other design criteria, such configurations generally will not be as desirable as the relatively simple design of manifold 44' insofar as additional costs will be incurred in forming and joining separate cover pieces.

Figure 3:
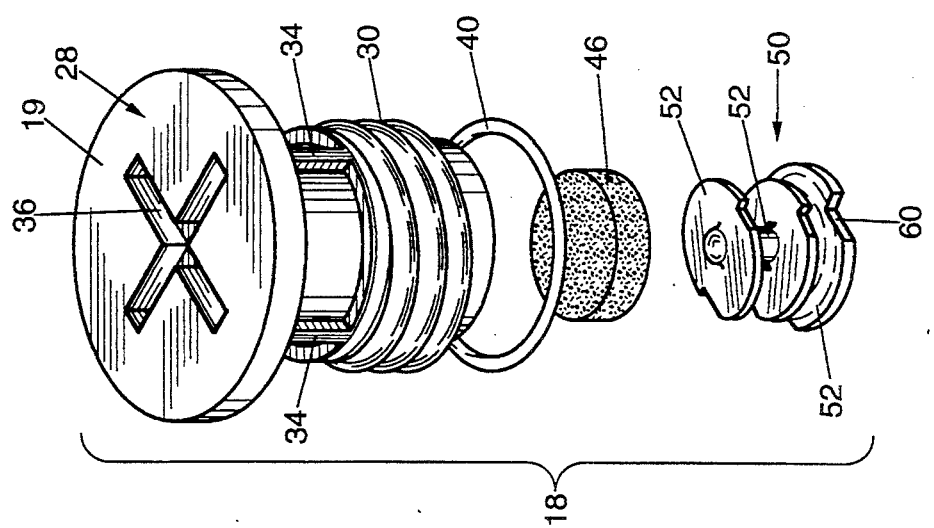
FIG. 3 is an exploded perspective view of the venting plug of the battery shown in FIG. 1 invention.

Referring now to FIGS. 2 and 3, more detailed views of the venting plugs incorporated in batteries of the present invention are shown. The venting plugs 18 comprised three separate pieces: a body portion 28, a baffle 50, and a flame-arresting member 46. The body portion 28 preferably is formed as a unitary, generally cylindrical piece. The body portion 28 includes a cylindrically-shaped side wall closed off by a top 19 at its upper end and open at its lower end, whereby the side wall and top of the body portion 28 define a generally cylindrical, central cavity. The body portion 28 of the venting plug 18 has reinforcing ribs 34 which extend generally between the top 19 of the venting plug 18 and a lower, threaded portion of the venting plug 18. The ribs 34 are angularly spaced on the side wall of the venting plug 18. Such reinforcing ribs 34 or their equivalent preferably are incorporated as they reinforce the body portion 28 and provide it with greater structural strength for a given amount of plastic material.

In the preferred embodiment, threads 30 on the body portion 28 engage corresponding threads on the inner surface of the process hole 22 to facilitate frictional engagement of the venting plug 18 in the process hole 22. It should be appreciated, however, consistent with the teachings of the present invention, that a non-threaded plug could be utilized with equal success. In such an embodiment, retentive frictional engagement between the venting plug 18 and the process hole 22, may be provided by a pressure-fit engagement between two contacting surfaces.

Threaded insertion of the venting plug 18 into the process hole 22 preferably is facilitated by driving slots 36. More particularly, the top 19 of the venting plug 18 includes driving slots 36 adapted to receive a driving tool, such as a screwdriver, for rotatably inserting the venting plug 18 into the process hole 22. The driving slots may be of any configuration suitable for such purposes.

Upon complete seating of the venting plug 18 within the process hole 22, an annular beveled edge 38 on the undersurface of the top 19 of the venting plug 18, abutts a corresponding chamfered edge 38' of the process hole 22. The seating force generated by the threaded insertion of the venting plug 18 creates a seal at the edge abuttment 38 and 38'. The seal serves to reduce undesired fluid leakage around the edge of the venting plug 18, and is preferred for that reason. It will be appreciated, however, that other means may be employed for forming a seal. For example, the underside of the plug top or an abutting surface of the process hole could be provided with a molded-in sealing bead or fin.

In keeping with the invention, a radially directed vent aperture extends through the side wall of the venting plug. The vent aperture is adapted to allow gaseous communication between the central cavity of the venting plug and the manifold as gas passes through the battery venting system, all as described in further detail below.

In the preferred embodiment 10, the vent aperture 32 in the side wall of the body portion 28 of the venting plug 18 has a generally oval shape, but the precise configuration of the vent aperture 32 is subject to wide variation. In general, the vent aperture should be sized and shaped to allow sufficiently rapid evacuation of gas generated within the battery cells, recognizing that enlargement of the vent aperture beyond a size sufficient for such purposes will make it easier for electrolyte to pass through the vent aperture as well.

The vent aperture communicates with the manifold. Preferably, as in the illustrated embodiment 10, gaseous communication between the vent aperture 32 and manifold 44' is indirect via a continuous space which extends between the venting plug 18 and the process hole 22, and more particularly, between the vent aperture 32 and the manifold opening 45. In accordance with this preferred aspect of the invention, the space is created by spacing a portion of the venting plug side wall, which portion includes the vent aperture, from a portion of the process hole side wall which includes the opening to the manifold.

More particularly, in the preferred embodiment 10, although not clearly illustrated by the exploded views of FIGS. 2 and 3, the aforesaid mentioned space is created by an annular offset 39 in the process hole 22. The offset 39 extends radially outwardly from the axis of the process hole 22, thereby providing the portion of the process hole 22 above the offset 39, which portion of the process hole 22 includes the manifold opening 45 with an increased diameter relative to the portion of the process hole 22 below the offset 39. The diameter of the venting plug 18, as measured across the reinforcing ribs 34, being less than that increased diameter of the process hole 22 above the offset 39, the vent aperture 32 is effectively spaced inwardly from the process hole manifold opening 45 to define an annular space by which gaseous communication is established between the vent aperture 22 and the manifold 44'. The edge abutment 38 and 38' serves to seal the top of the annular space, while an o-ring seal 40 is provided to seal the bottom of the annular space.

It should be appreciated that the annular space formed around the venting plugs 18 and within the process holes 22 obviates the need to provide any particular alignment between the vent aperture 32 and the openings 45 of the manifold 44'. It can be further appreciated that the gas expelled through vent aperture 32 of a venting plug 18 located near the central portion of the battery 10 is able to pass through the manifold 44' and ultimately to the ambient via the respective annular spaces of process holes 22 interposed between that particular process hole 22 and the end of the battery 10. Thus, in addition to obviating the need for providing alignment between the vent apertures 32 and the openings 45 of the manifold 44', a second function of the annular spaces is to allow gaseous communication between the central process holes 22 and the end of the battery 10.

In the preferred embodiment 10, the space between the vent aperture 32 and process hole manifold opening 45 is created by offsetting a portion of the process hole 22. If desired, however, a functionally equivalent space may be created by inwardly offsetting a portion of the venting plug side wall, or by offsetting portions of both the process hole and venting plug.

It will be appreciated, however, that an additional vent aperture may be provided in the venting plug and that the threads may be located so that the vent apertures are aligned to at least partially overlap with the manifold openings in the process holes. In such a design, the space between the venting plug and process holes could be minimized or eliminated entirely.

The venting plug preferably incorporates a flame-arresting member which is disposed in the central cavity between the vent aperture and the baffle. The flame-arresting member serves to insulate the cell cavity, where combustible gases are at their highest concentrations, from sparks or other sources of ignition. In the preferred embodiment 10, the flame-arresting member is a disc 46 which is made from micro porous polypropylene or other conventional flame-retardant materials having a porous composition which enables gas to pass through the disc 46. The flame-arresting disc 46 seats against a reduced diameter portion 48 of the inside surface of the side wall of the venting plug 18 where it is generally held in place by the baffle 50. Other means for mounting the flame-arresting disc 46 may be utilized, however, and the shape of the flame-arresting member may be adapted to conform therewith.

In accordance with another aspect of the invention, the baffle 50 is position in the central cavity of the venting plug between the vent aperture and the lower end of the venting plug. The baffle is adapted to allow the passage of gases from within the cell cavity ultimately to the ambient and to retard the passage of electrolyte from the cell cavity through the venting plug central cavity.

In the preferred embodiment 10, the baffle 50 comprises three disc-shaped members 52 mounted upon a central stem 54. The lowermost disc-shaped member is disposed in a plane normal to the central stem 54, and snaps into an annular retaining groove 56 provided in the interior surface of the side wall, near the bottom of the venting plug 18. The two other disc-shaped members are disposed obliquely to each other and to the lowermost disc-shaped member.

Passageways between the baffle 50 and the venting plug side wall, which in the embodiment 10 are slots 60, are provided along the periphery of each disc-shaped member 52, so as to allow passage of the gaseous matter generated within the cell to pass upwardly through the baffle 50. It should be appreciated from the foregoing description that, while the slots 60 freely allow passage of gaseous matter through the baffle 50, the opposedly angled disposition of the disk-shaped elements 52 provide effective retention of the electrolyte within each respective charging cell.

The baffle 50 prevents excessively great quantities of electrolyte from sloshing into the central cavity of the venting plug to a point where it can pass through the vent aperture and efficiently collects finely divided electrolyte which may be suspended in exiting gas. Other baffle arrangements, however, may be used. Similarly, the baffle may be mounted in the venting plug by other means, for example, by adhesives, by spin-welding, or by engaging one of the other disc-shaped members 52 in a retaining groove.

In view of the discussion presented above, it should be understood that the venting provided by the present invention occurs as follows. Gaseous matter generated within each charging cell passes upwardly through the slotted portions 60 of the baffle 50, through the porous material of the flame-arresting disc 46, outwardly through the vent aperture 32, into the annular space formed between the venting plug 18 and the process hole 22, and into the manifolding passageway 44. It is then communicated along the passageway 44 and through any intervening annular chambers until reaching the end of the battery 10, where is it expelled from the exhaust port 64 at the end of the manifolding passageway 44. Electrolyte in large part is blocked and collected by the baffle 50 so that electrolyte loss from the battery is minimized.

It will be appreciated, therefore, that batteries of the subject invention, especially in their preferred embodiments as described above, may be easily and economically manufactured. The design of the venting system is relatively simple and easy to mold, and in particular, will allow molding of the cover as a single piece. Moreover, by molding the baffle as a separate piece, a highly efficient baffle may be provided to minimize the escape of electrolyte, even when the battery is vibrated or tilted at extreme angles, without making molding of the cover more difficult or impractical. Incorporating a flame-arresting member also diminishes the likelihood of igniting gas mixtures within the battery, while allowing for venting of those gases to the ambient.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A wet, multicell, lead-acid electric storage battery comprising a container, a cover, one or more partition walls dividing the space within the container and cover into two or more cell cavities, the cover defining cylindrically shaped process holes associated with each cell cavity, and a venting system, which venting system comprises:

a manifold defined by the cover, the manifold having at least one opening in each process hole and at least one opening in the cover and being adapted to provide gaseous communication between the process holes and the ambient; and a venting plug associated with each process hole and adapted for insertion therein;

the venting plugs having a cylindrical side wall, a closed upper end, an open lower end, and a central cavity;

a vent aperture located in the side wall of the venting plug in gaseous communication with the manifold and the venting plug central cavity; and a baffle positioned within the venting plug central cavity between the vent aperture and the lower end of the venting plug, the baffle being adapted to allow the passage of gases and to retard the passage of electrolyte from the cell cavity through the venting plug central cavity.

2. The battery according to claim 1, wherein the baffle includes two or more disc-shaped members disposed on a central stem.

3. The battery according to claim 2, wherein each disc-shaped member has at least one gaseous passageway.

4. The battery according to claim 2, wherein each disc-shaped member is disposed at an oblique angle to the other disc-shaped members.

5. The battery according to claim 2, wherein the venting plug further includes an annular retaining groove in the venting plug side wall, the annular retaining groove and at least one of the disc-shaped members being adapted for mutual engagement to retain the baffle within the venting plug central cavity.

6. The battery according to claim 1, wherein the venting plug includes a flame arresting member disposed between the vent aperture and the baffle.

7. The battery according to claim 1, wherein a portion of the venting plug side wall including the vent aperture is spaced inwardly from a portion of the process hole including the process hole manifold opening, thereby defining a continuous space between the vent aperture and the process hole manifold opening adapted to provide gaseous communication between the vent aperture and the manifold.

8. The battery of claim 1, wherein the manifold includes a series of axially aligned, cylindrically shaped passageways extending between openings in the side walls of adjacent process holes and openings in the cover.

9. A wet, lead-acid electric storage battery comprising a container, a cover, five partition walls dividing the space within the container and cover into six substantially isolated cell cavities, the cover defining six cylindrically shaped process holes, one associated with each cell cavity, and a venting system, which venting system comprises:

a cylindrically shaped manifolding passageway integrally formed in the cover and extending through the process holes and cover, the manifolding passageway having at least one opening in each process hole and openings on each side of the cover and adapted to provide gaseous communication between the process holes and the ambient; and a venting plug associated with each process hole and adapted for threaded insertion therein;

the venting plugs having cylindrical side walls, a closed upper end, an open lower end, and a central cavity;

a vent aperture located in the side wall of the venting plug in gaseous communication with the manifolding passageway and the venting plug central cavity;

a baffle positioned within the venting plug central cavity between the vent aperture and the lower end of the venting plug, the baffle being adapted to allow the passage of gases and to retard the passage of electrolyte from the cell cavity through the venting plug central cavity; and an annular retaining groove in the venting plug side wall near the open end of the venting plug, the annular retaining groove and the baffle being adapted for mutual engagement to retain the baffle in the venting plug central cavity.

10. The battery according to claim 9, wherein the baffle includes two or more disc-shaped members disposed on a central stem and the annular retaining groove and at least one disc-shaped member are adapted for mutual engagement to retain the baffle within the venting plug control cavity.

11. The battery according to claim 9, wherein the venting plug includes a flame arresting member disposed between the vent aperture and the baffle.

12. The battery according to claim 9, wherein a portion of the venting plug side wall including the vent aperture is spaced inwardly from a portion of the process hole including the process hole manifold opening, thereby defining a continuous space between the vent aperture and the process hole manifold opening adapted to provide gaseous communication between the vent aperture and the manifold.

13. A venting plug for use with a wet, multicell, lead-acid electric storage battery of the type having a container, a cover, one or more partition walls dividing the space within the container and cover into two or more cell cavities, the cover defining cylindrically shaped process holes associated with each cell cavity, and a manifold formed in the cover, the manifold having at least one opening in each process hole and at least one opening in the cover and being adapted to provide gaseous communication between the process holes and the ambient, wherein the venting plug is adapted for insertion into the process holes and comprises:

cylindrical side walls, a closed upper end, an open lower end, and a central cavity;

a vent aperture located in the side wall of the venting plug, the vent aperture being in gaseous communication with the central cavity and adapted to communicate with the manifold when the venting plug is inserted into the process hole; and a baffle positioned within the central cavity between the vent aperture and the lower end of the venting plug, the baffle being adapted to retard the passage of electrolyte from the cell cavity through the venting plug central cavity when the venting plug is inserted into the process hole.

14. The venting plug according to claim 13, wherein the baffle includes two or more disc-shaped members disposed on a central stem.

15. The venting plug according to claim 14, wherein each disc-shaped member has at least one gaseous passageway.

16. The venting plug according to claim 14, wherein each disc-shaped member is disposed at an oblique angle to the other disc-shaped members.

17. The venting plug according to claim 14, wherein the venting plug further includes an annular retaining groove in the venting plug side wall, the annular retaining groove and at least one of the disc-shaped members being adapted for mutual engagement to retain the baffle within the venting plug central cavity.

18. The venting plug according to claim 13, wherein the venting plug includes a flame arresting member disposed between the vent aperture and the baffle.

19. The venting plug according to claim 13, wherein a portion of the venting plug side wall including the vent aperture is spaced inwardly from a portion of the process hole including the process hole manifold opening, when the venting plug is inserted in the process hole, thereby defining a space between the vent aperture of the inserted venting plug and the process hole manifold opening adapted to provide gaseous communication between the vent aperture and the manifold.

* * * * *